US000001844H

United States Statutory Invention Registration [19]

[11] Reg. Number: H1,844

Billmers et al. [45] Published: Mar. 7, 2000

[54] LASER MAGNETO-OPTIC ROTATION SPECTROMETER (LMORS)

[75] Inventors: Richard Billmers, Bensalem, Pa.; William J. Scharpf, Huntingtown; Alan Laux, Lexington Park, both of Md.; Kevin Owens, Springfield, Pa.

[73] Assignee: The United States of America as represented by the Secretary of the Navy, Washington, D.C.

[21] Appl. No.: 09/073,539

[22] Filed: May 6, 1998

[51] Int. Cl.[7] ..... G01J 3/36

[52] U.S. Cl. ..... 356/307

[58] Field of Search ..... 356/307, 312, 356/319, 320, 323, 325, 311

[56] References Cited

U.S. PATENT DOCUMENTS 4,035,083 7/1977 Woodruff et al. .
5,530,541 6/1996 Ahn et al. .

OTHER PUBLICATIONS

Yeh, "Dispense magnetoptic filters" Applied optics Jun. 1, 1982 vol. 21, No. 11.
Maeda et al; "Quantitive Detection . . . Quenching" Applied Optics vol. 16, No. 2 pp. 403–406, Feb. 1977.

*Primary Examiner*—Daniel T. Pihulic
*Attorney, Agent, or Firm*—Ron Billi

[57] ABSTRACT

A magneto-optical rotation (MOR) spectrometer is disclosed having a laser as a light source and providing a high intensity input light source that yields improvements in the detection limits and in the dynamic operating ranges of the MOR spectrometer.

8 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG−3

LASER MAGNETO-OPTIC ROTATION SPECTROMETER (LMORS)

BACKGROUND OF THE INVENTION 1.0 Field of the Invention

The present invention relates to a spectrometer for measuring atomic concentrations of an element within a substance and, more particularly, to a magneto-optic rotation (MOR) spectrometer having a high intensity laser source that improves the detection limits and the dynamic range of the (MOR) spectrometer.

2.0 Description of the Prior Art

Spectrometers employing spectroscopes are commonly employed in chemical analysis for the detection and measurement of atomic concentration of metals, such as alkali metals of sodium (Na) or potassium (k) in, for example, environmental samples or in shipboard fuels to detect for salt water intrusion. One traditional method of measuring atomic concentrations uses atomic absorption spectroscopy (AAS), herein referred to as an AAS spectrometer, more fully described, for example, in the text of A. Varma, *Handbook of Atomic Absorption Analysis,* Vol. 1 & 2 (CRC Press, 1984). In this technique, the sample to be tested is atomized, usually by aspirating into a flame or vaporized by a graphite furnace. Light from a hollow cathode lamp, serving as the light source of the AAS spectrometer, passes through the vapor where atoms absorb part of the light. According to the Beer-Lambert's law, the measured atomic absorption varies linearly with the atomic concentration of the element being analyzed. The detection of low concentrations by the AAS spectrometer is limited by its ability of measuring a small signal on top of a large signal representative of the background. Measuring concentrations larger than the upper limit for measuring by the AAS spectrometer requires dilution of the sample being measured, which increases the error in the measurement and also its measurement time. The dynamic range in AAS is defined by the difference or ratio of the lower and upper measurable ranges. Present AAS systems are mainly limited by their low dynamic ranges, ~2 orders of magnitude, and sensitivity.

While AAS techniques for detecting alkali metals are well documented, this technique is actually too sensitive. For example, Na and K are easily measured in the part-per-billion range (ppb), however, part-per-million (ppm) samples must be diluted by three orders of magnitude to be in the linear range of the AAS spectrometer. These dilutions require large amounts of operator time and introduce error into the analysis. A technique which extends the useable dynamic range from the ppb to the ppm range would enhance the accuracy of the measurements and decrease greatly the amount of time required for the analysis. It is desired that a spectrometer be provided utilizing techniques that increase the detection limits and the dynamic range of detection.

Another disadvantage of an AAS spectrometer is the size and weight of its components. More particularly, AAS spectrometers require the use of ¼ to ½ meter monochromators to separate the various wavelengths of light generated by its light source. These monochromators cause the AAS spectrometer to be too large for use on shipboard and aircraft platforms. It is desired that a spectrometer be provided that is free of monochromators. The elimination of the monochromators would result in a significant size and weight reduction and could potentially make the use of detecting metals in engine lubricants feasible onboard ships. Currently the engine lubricants are commonly sent off ship to be analyzed which create a long lag time for detecting potential problems. Furthermore, ships docking in port can't dump their water possibly containing contaminants until the water is analyzed. A man-portable atomic analysis method and related spectrometer would save considerable time and money in situations such as these.

An alternative method that is free of monochromators and that employs a Faraday or Voigt technique for measuring atomic concentrations and uses a magneto-optical rotation (MOR) effect is found in MOR spectrometers. The mechanism behind this MOR effect involving atomic vapors contained in vapor cells is Zeeman splitting of the atomic energy levels resulting from an applied magnetic field and is more fully described in the technical article entitled "Dispersive Magnetooptic Filters" of P. Yeh, published in *Appl. Opt.* 21, 2070 (1982). At a specific combination of optical frequency provided by the light source of the MOR spectrometer, pathlength, and atomic concentration, the polarization of plane-polarized light will be altered by the addition of a component which is rotated by $\pi/2$ radians. Cross polarizers, placed before and after the vapor cell, block all frequencies of light except for a very narrow band in the wings of the transition regions of the plane-polarized light that has been altered. The monochromators are not necessary in the Faraday or Voist technique utilized in MOR spectrometers since the cross-polarizers block all light which is not rotated, and, therefore, eliminate the need of the monochromators to separate the numerous spectrum lines generated by the light source of MOR spectrometers. Since the polarization change is very sensitive to atomic concentration, the transmission through the cross polarizers is well suited as an analytical tool for measuring unknown atomic concentrations.

MOR spectrometers are known and employ a hollow cathode lamp similar to those employed by AAS spectrometers. MOR spectrometers, although free of the relatively heavy monochrometers, have undesired detection limits and dynamic ranges similar to those of AAS spectrometers. It is desired to provide MOR spectrometers having an advantageous attendant light weight aspect but, in addition thereto, having improved detection limits and increased dynamic ranges.

OBJECTS OF THE INVENTION

It is a primary object of the present invention to provide for an improved magneto-optical rotation (MOR) spectrometer so as to be free of the undesired weight of monochrometers, while at the same time gaining improved detection limits and increased dynamic ranges.

It is another object of the present invention to provide an improved MOR spectrometer having various selectable means for atomizing samples being analyzed.

Another object of the present invention is to provide an improved MOR spectrometer having a light source that provides for a selectable operating wavelength that is particularly suited for the sample being measured by the MOR spectrometer.

It is an object of the present invention to provide for detection means that assist in the attainment of improved detection limits, and increased dynamic ranges of the MOR spectrometer.

Further, it is an object of the present invention to provide for an improved MOR spectrometer having various selectable means to provide a magnetic field for the desired operation of the MOR spectrometer.

SUMMARY OF THE INVENTION

The present invention is directed to a magneto-optical rotation (MOR) spectrometer having a laser light source that provides increased intensity that yields improvement in detection limits in dynamic ranges of the MOR spectrometer.

The spectrometer measures the atomic concentration of an element in a substance and comprises means for atomizing the substance in a chamber, magnetic means, first and second optical polarizers, a laser source, and an optical detector. The magnetic means surrounds the atomized substance in the chamber but leaves a passageway having entrance and exit portions into and from the chamber. The first and second optical polarizers are respectively located at the entrance and exit portion of the passageway. The laser source has a predetermined intensity and comprises collimated light rays that are focused so as to pass through the first optical polarizer, into and out of the chamber, and then pass through the second optical polarizer. An optical detector detects the intensity of the rays of the laser after the laser rays have passed through the second optical polarizer and provides a representative output signal thereof.

BRIEF DESCRIPTION OF THE DRAWINGS

These are other objects, features and advantages of the present invention, as well as the invention itself, will become better understood by reference to the following detailed description when considered in conjunction with the accompanying drawings, wherein like reference numbers designate identical or corresponding parts throughout and wherein.

DETAILED DESCRIPTION OF THE PREFERRED EMBODIMENTS

Figure 1:
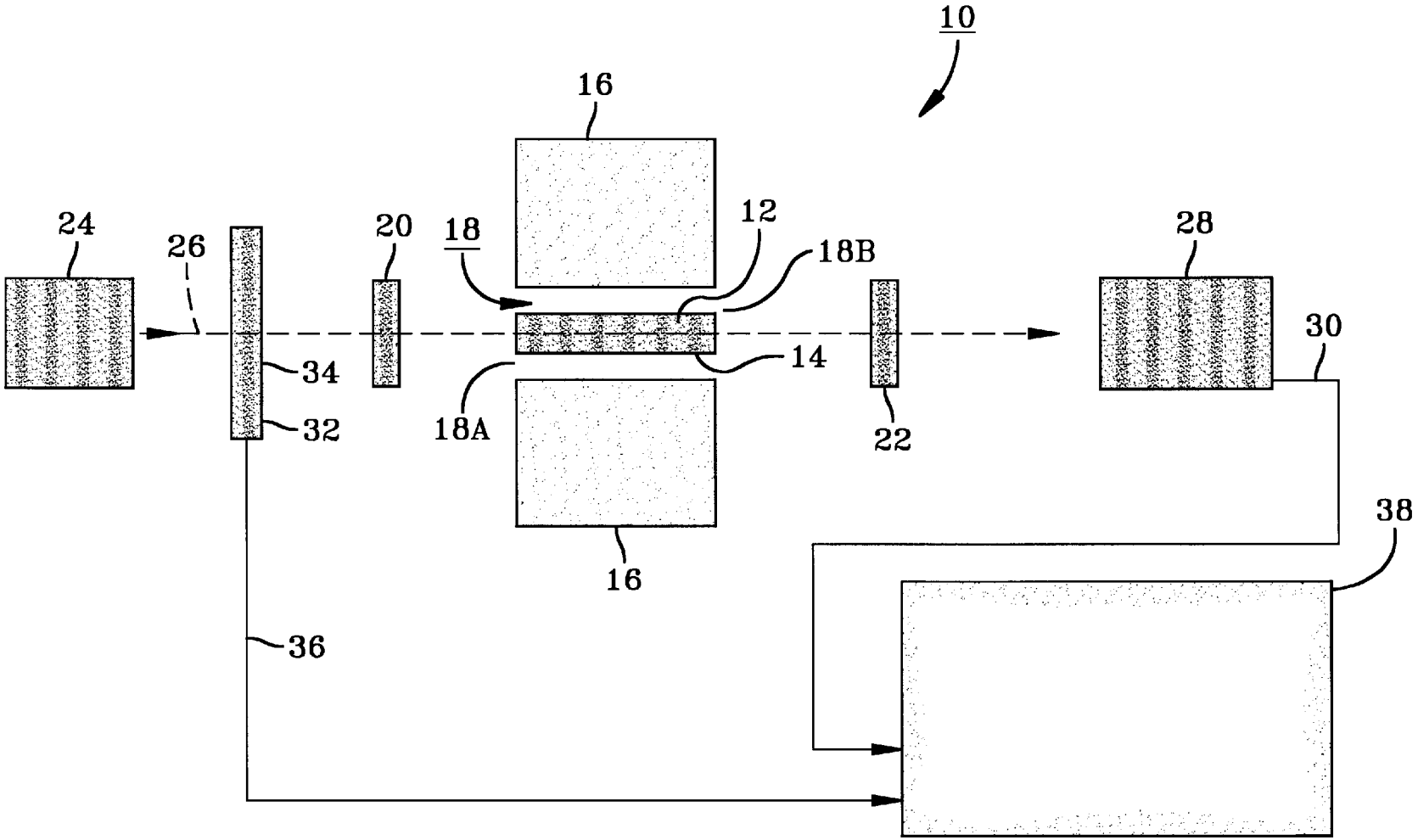
FIG. 1 is a block diagram of one embodiment of a MOR spectrometer of the present invention.

Referring to the drawings, there is shown in FIG. 1 a block diagram of a system 10 of one embodiment of a magneto-optical rotation (MOR) spectrometer used for chemical analysis by detecting and measuring the atomic concentration of elements in a substance or sample 12. The MOR spectrometer 10 comprises means for atomizing the sample 12 in a chamber 14 and magnetic means 16 surrounding the atomized sample 12 but leaving a passageway 18 having entrance and exit portions 18A and 18B, respectively, into and out of the chamber 14 respectively. The MOR spectrometer 10 further includes first and second optical polarizers 20 and 22 respectively located in the general region of the entrance 18A and exit 18B portions of the passageway 18. The MOR spectrometer 10 utilizes a laser source 24, which is of particular importance to the present invention, having a predetermined intensity and providing collimated light rays that are focused onto a pathway 26 so as to pass through the first optical polarizer 20, into and out of the chamber 14, and then pass through the second optical polarizer 22, where the collimated rays are intercepted by an optical detector 28. The polarizers 20 and 22 are preferably arranged, in a manner known in the art, so as to be crossed. More particularly, the polarizers 20 and 22 should be arranged or aligned so that light passing through both of the polarizers 20 and 22 is minimal when the system 10 is not sensing any atoms or molecules under test. The optical detector 28 detects the intensity of the rays of the laser after the rays have passed through the second optical polarizer 22 and which optical detector 28 provides a representative output signal on signal path 30.

For the embodiment of FIG. 1, an optical modulator 32, operating in a manner known in the art, is interposed between the laser source 24 and the first polarizer 20. The modulator 32 intercepts the collimated rays of laser source 24 and provides a modulated light output at its port 34 that is directed along path 26 to the first optical polarizer 20. The modulator 32 also provides a modulated electrical signal output that is applied to signal path 36 routed to a lock-in amplifier 38 which also receives the output of the optical detector 28 on signal path 30.

The sample 12 may contain any element, such as sodium, potassium, rubidium, or copper, each being of an atomic concentration. The atomic concentration may be analyzed by, in part, the MOR spectrometer 10 by means of its laser source 24 providing electromagnetic radiation at a selected operating wavelength that corresponds to the element associated with the atomic concentration being analyzed. For example, for the element rubidium, the laser source 24 is selected to provide a particular electromagnetic radiation at the operating wavelength of 795 nm, whereas for an atomic concentration of the element copper, Cu, in the sample 12, the MOR spectrometer 10 provides electromagnetic radiation at an operating wavelength of 325 nm. These selected operating wavelengths for the MOR spectrometer are the same as the operating wavelengths selected for the AAS spectrometers discussed in the "Background" section.

The sample 12 is atomized, usually by aspiring into a flame or vaporized by a graphite furnace (known in the art) all within the proximity of chamber 14. Further, the sample 12 may be atomized by cold vapor generation, by laser induced breakdown, all known in the art.

The magnetic means 16, for the embodiment of FIG. 1, comprises an electromagnet which generates a magnetic field of up to about 10 KG. The polarizers 20 and 22 placed before and after the chamber 14 are known in the art and can be rotated to cause light passing through them to be polarized in any particular plane, between horizontal and vertical dependent on the degree of rotation. For the embodiments of the present invention, the optical polarizers 20 and 22 are rotated so that the polarization will rotate by $\pi/2$ radians. The optical polarizers 20 and 22 block all frequency of light except for a very narrow band in the wings or fringes of the polarized light transition region that is being rotated.

The laser source 24 provides collimated light rays at a predetermined intensity such as 3 milliwatts, and having an operating wavelength in the range from about 200 nm to about 900 nm.

The output of the optical detector 28 is representative of the atomic concentration of the element contained in the sample 12 being analyzed and is applied to the lock-in amplifier 38.

The lock-in amplifier 38, known in the art, has a balanced amplifier and two branches with the first branch receiving the output of the optical detector 28 on signal path 30 and the second branch receiving the modulated signal of the modulator 32 on signal path 36 serving as a reference signal. The lock-in amplifier 38 provides an output representative of the signal being measured. This output signal of lock-in amplifier 38 is representative, in one embodiment, of the atomic concentration of the element being measured and contained in the sample 12.

In the practice of the present invention, two spectrometers, one being an AAS spectrometer and the other being a MOR spectrometer 10, were used for measuring the atomic concentration of rubidium in a sample 12. The two spectrometers were set-up to measure the rubidium concentration in sample 12 and both excited the sample 12 with light having a wavelength of 795 nm, with the AAS spectrometer using laser source 24 and the MOR spectrometer 10 also using the laser source 24. The results of the testing of the AAS spectrometer are shown in FIG. 2, whereas the results of the testing for the MOR spectrometer 10 are shown in FIG. 3.

Figure 2:
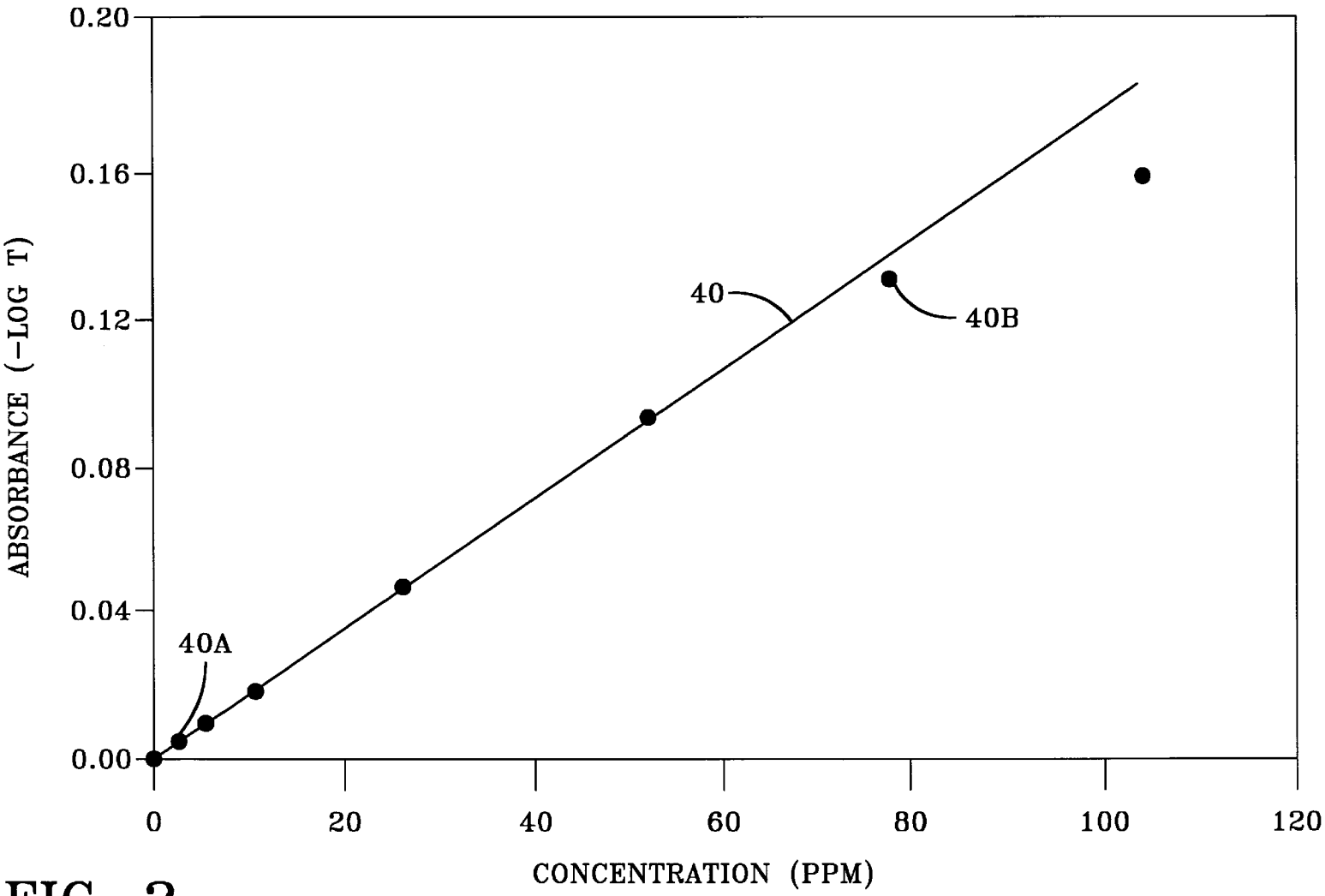
FIG. 2 illustrates a calibration curve for a conventional atomic absorption spectroscopy (AAS) analyzing the atomic concentration of an element Rb by the use of rays of a light source having an operating wavelength of 795 nm.
Figure 3:
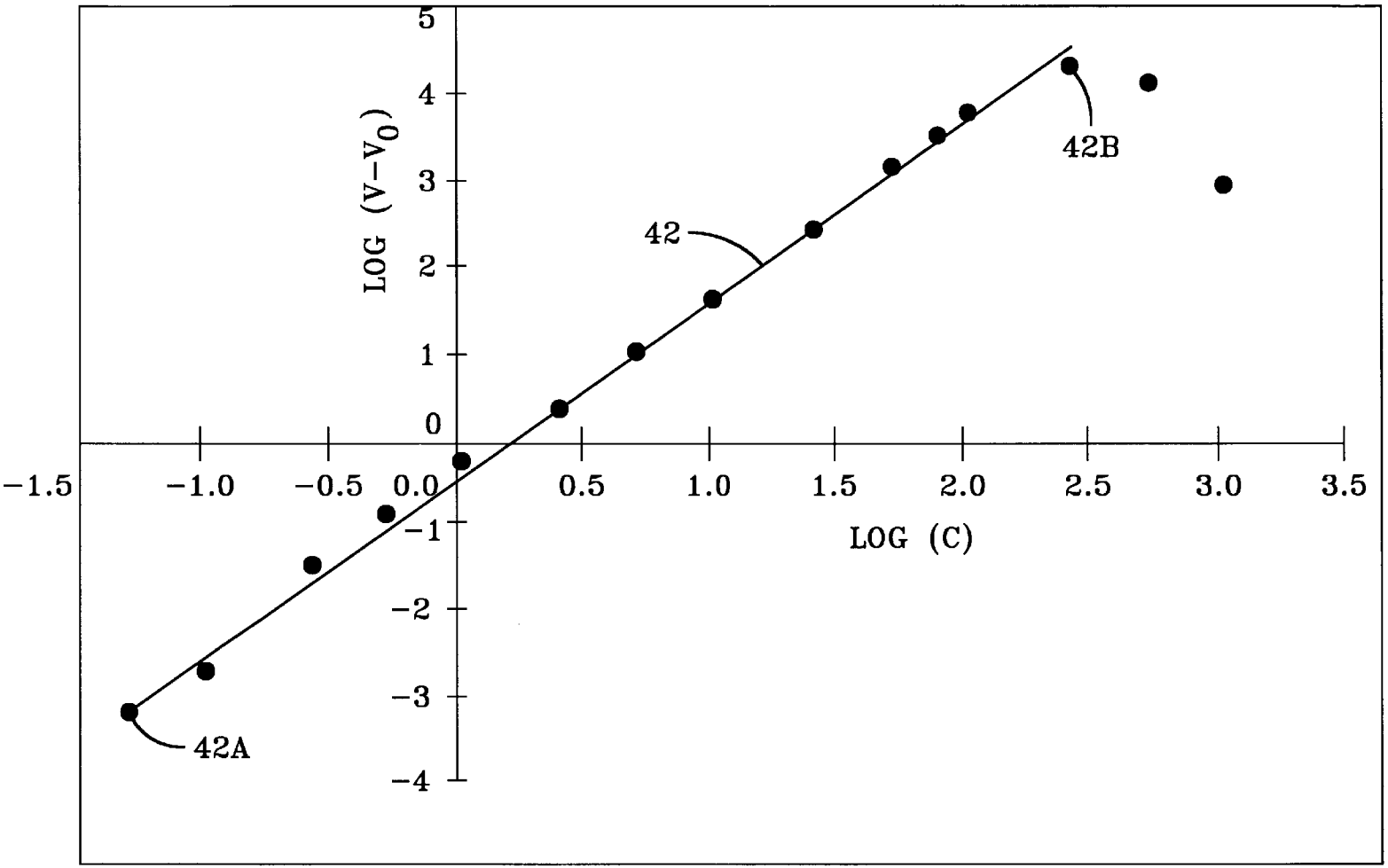
FIG. 3 is a calibration curve for the MOR spectrometer of FIG. 1 for analyzing the same element Rb of FIG. 2 by the use of a laser source having an operating wavelength of 795 nm and showing a 10-fold improvement of the detection limit and dynamic range over the AAS analysis of FIG. 2.

Both FIGS. 2 and 3 illustrate performance characteristics previously described in the "Background" section. More particularly, both FIGS. 2 and 3 indicate dynamic measuring ranges that are defined by the difference or ratio of the lower and upper measurable range which, in turn, are respectively defined by the minimum and maximum measurable atomic concentrations.

FIG. 2 has an X axis indicating the concentration of Rb in ppm and a Y axis indicated by the absorbance by means of -logT, where T represents transmission. Further, FIG. 2 illustrates a calibration curve 40, having end points 40A and 40B, wherein end point 40A indicates a minimum concentration of 500 ppb and represents the detection limit of the AAS spectrometer and end point 40B indicates a maximum concentration of 50 ppm. The minimum concentration of 500 ppb and the maximum concentration of 50 ppm define a dynamic range of approximately $10^2$.

FIG. 3 has a Y axis given in log ($V-V_o$), where V (voltage) represents an active signal produced by the concentration being measured and $V_o$ (voltage) represents a zero correction signal for the concentration being measured. FIG. 3 illustrates a calibration curve 42 having end points 42A and 42B, wherein 42A represents the detection limit of 50 ppb and 42B which represents a maximum measurable concentration of 200 ppm. In a manner as previously discussed, the dynamic range illustrated in FIG. 3 is approximately $10^3$.

A comparison between FIG. 2 and FIG. 3, reveals that the MOR spectrometer 10 of FIG. 1 represents a 10-fold improvement in the detection limit and in the dynamic range as compared to that achievable by an AAS spectrometer.

A second embodiment of the present invention may be further described with reference to the MOR spectrometer 44 having the block diagram illustrated in FIG. 4. The MOR spectrometer 44 utilizes the same components 14, 20, 22 and 28 of FIG. 1, as well as having a pathlength 26 previously described with reference to FIG. 1. The MOR spectrometer 44 further comprises permanent magnet 46 that generates a magnetic field of up to about 4 KG. The permanent magnet 46 surrounds the atomized substance in the chamber 14 but leaves a passageway 18 having entrance and exit portions 18A and 18B into and out of the chamber 14 and in which the first and second optical polarizers 20 and 22 are respectively located.

The MOR spectrometer 44 has a laser source comprising an Nd:YAG source 48, a first frequency doubler 50, a dye laser source 52, and a second frequency doubler 54. The MOR spectrometer 44, in particular the laser source thereof, in one application provides for an electromagnetic radiation in the form of a laser beam having an operating wavelength of 525 nm and that is used to analyze the element, copper, contained in the sample 12.

The Nd:YAG laser 48 provides collimated light rays having an operating frequency of 1064 nm and the output thereof is illustrated by directional arrow 56 which is directed onto the first frequency doubler 50 which, in turn, provides a collimated light beam, indicated by directional arrow 58, having an operating frequency of 532 nm which is used to pump the dye laser 52.

The dye laser 52, known in the art, provides for the generation of tuneable light at or near 650 nm and which for one embodiment was actually an operating wavelength of 649.4 nm. The laser beam, shown by directional arrow 60, of dye laser 52 is directed to the frequency doubler 54 which provides for the generation of a laser beam having an operating wavelength of 325 nm which in one embodiment was actually an operating wavelength of 324.7 nm and is shown by directional arrows 62. The laser beam 62 is focused onto the first optical polarizer 20. The optical polarizers 20 and 22 operate in a manner as previously described with reference to FIG. 1 and provides a laser output indicated by directional arrow 63 which is intercepted by optical detector 28. Optical detector 28 provides an output signal representation of the atomic concentration of the element contained in the sample being measured.

In the practice of the present invention, and in a manner as previously described with reference to FIGS. 1–3, two spectrometers were used for measuring the concentration of copper, Cu, in the sample 12 and utilized the electromagnetic radiation having an operating wavelength of 325 nm. One spectrometer was of the AAS spectrometer and the other spectrometer was the MOR spectrometer 44 of FIG. 4. The results obtained by the AAS spectrometer are given in FIG. 5, whereas the results obtained by the MOR spectrometer 44 are given in FIG. 6.

Figure 5:
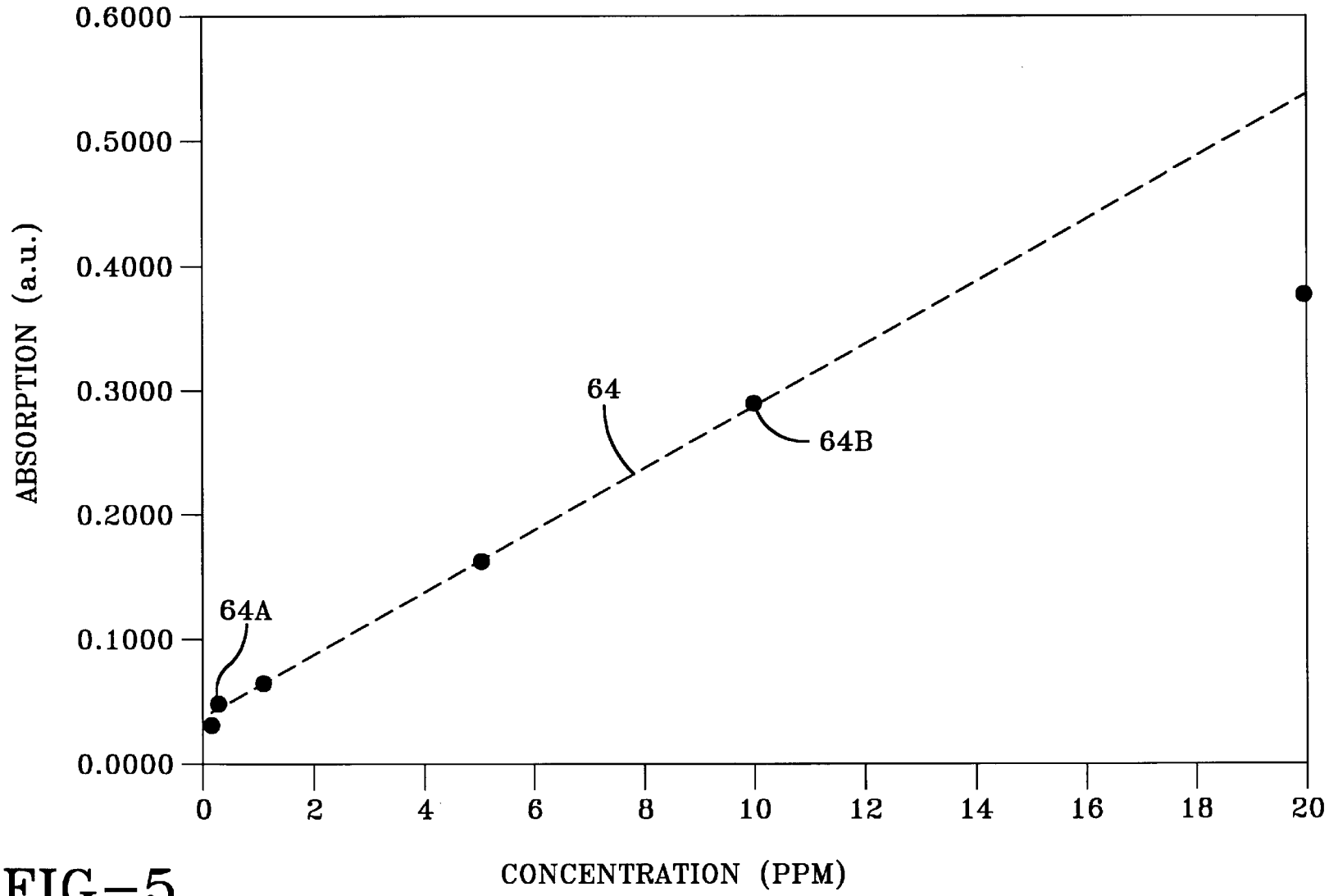
FIG. 5 is a calibration curve of a conventional AAS analyzing the atomic concentration of the element Cu by the use of rays of a light source having an operating wavelength of 325 nm.

FIG. 5 has a X axis given in concentration (ppm) and a Y axis given in absorption (a.u.), where a.u. represents absorption units. FIG. 5 illustrates a calibration curve 64 for the copper (Cu) analysis utilizing a 325 nm operating wavelength. Curve 64 has end points 64A and 64B respectively indicative of 100 ppb and 10 ppm concentration. End point 64 represents a detection limit of 100 ppb, whereas end point 64 represents the maximum measurable concentration. The concentrations of end points 64A and 64B define a dynamic measurement range of approximately $10^2$.

Figure 6:
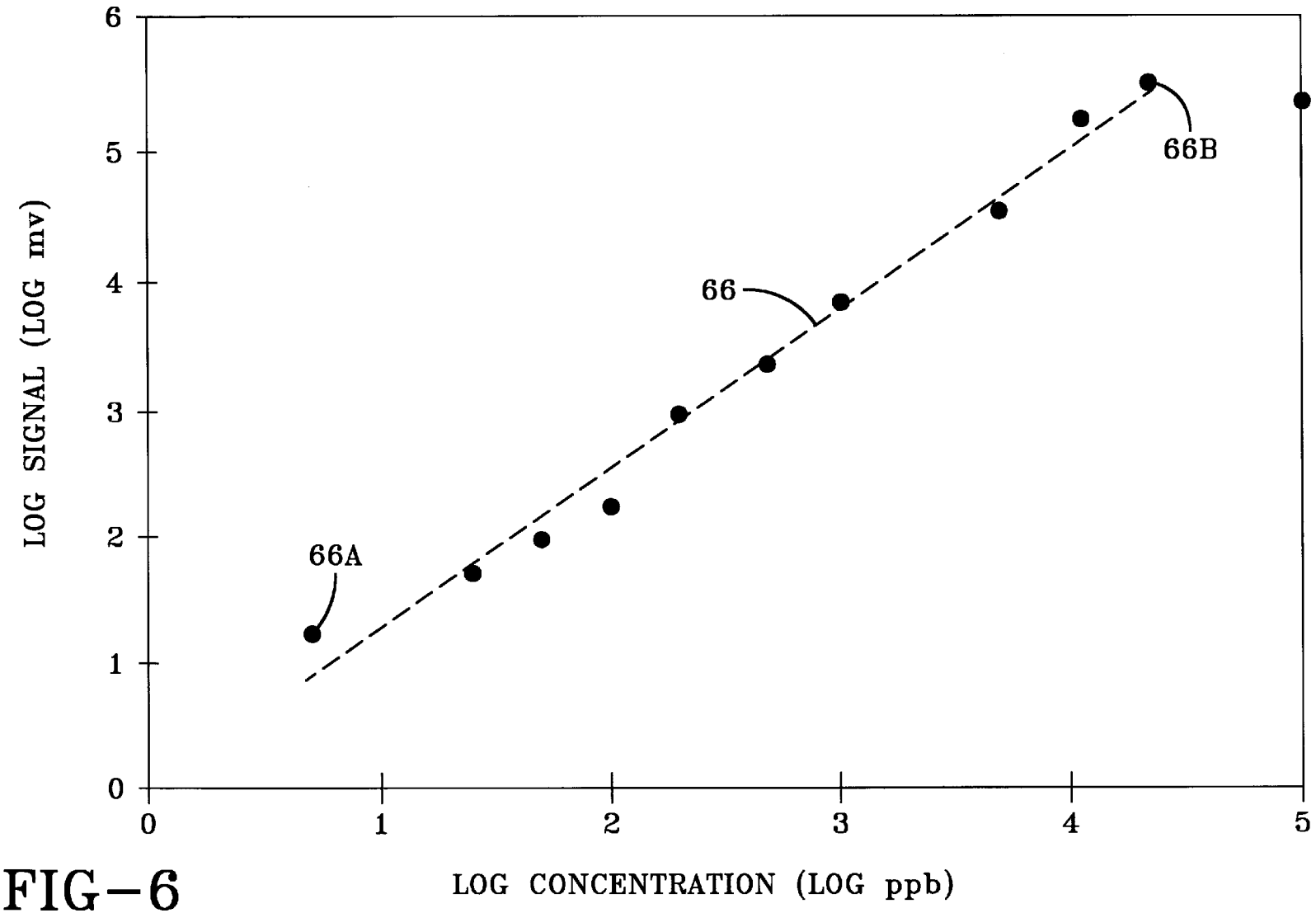
FIG. 6 is a calibration curve of the MOR spectrometer of FIG. 4 analyzing the same atomic concentration of Cu of FIG. 5 at the same operating wavelength 325 nm as that of FIG. 5, but, because of the use of a high intensity laser source, showing a 10-fold improvement in the detection limit and dynamic range relative to that of FIG. 5.

FIG. 6 has an X axis given in log concentration (log ppb) and a Y axis given in log signal (log mv), wherein the signal, log mv, represents the signal from the optical detector 28. FIG. 6 illustrates a calibration curve 66 having end points 66A and 66B, wherein end points 66A represent a minimum measurable concentration of 5 ppb and end point 66B represents a maximum measurable concentration of 200 ppm. The calibration curve 66 indicates a dynamic range of $10^3$.

Figure 4:
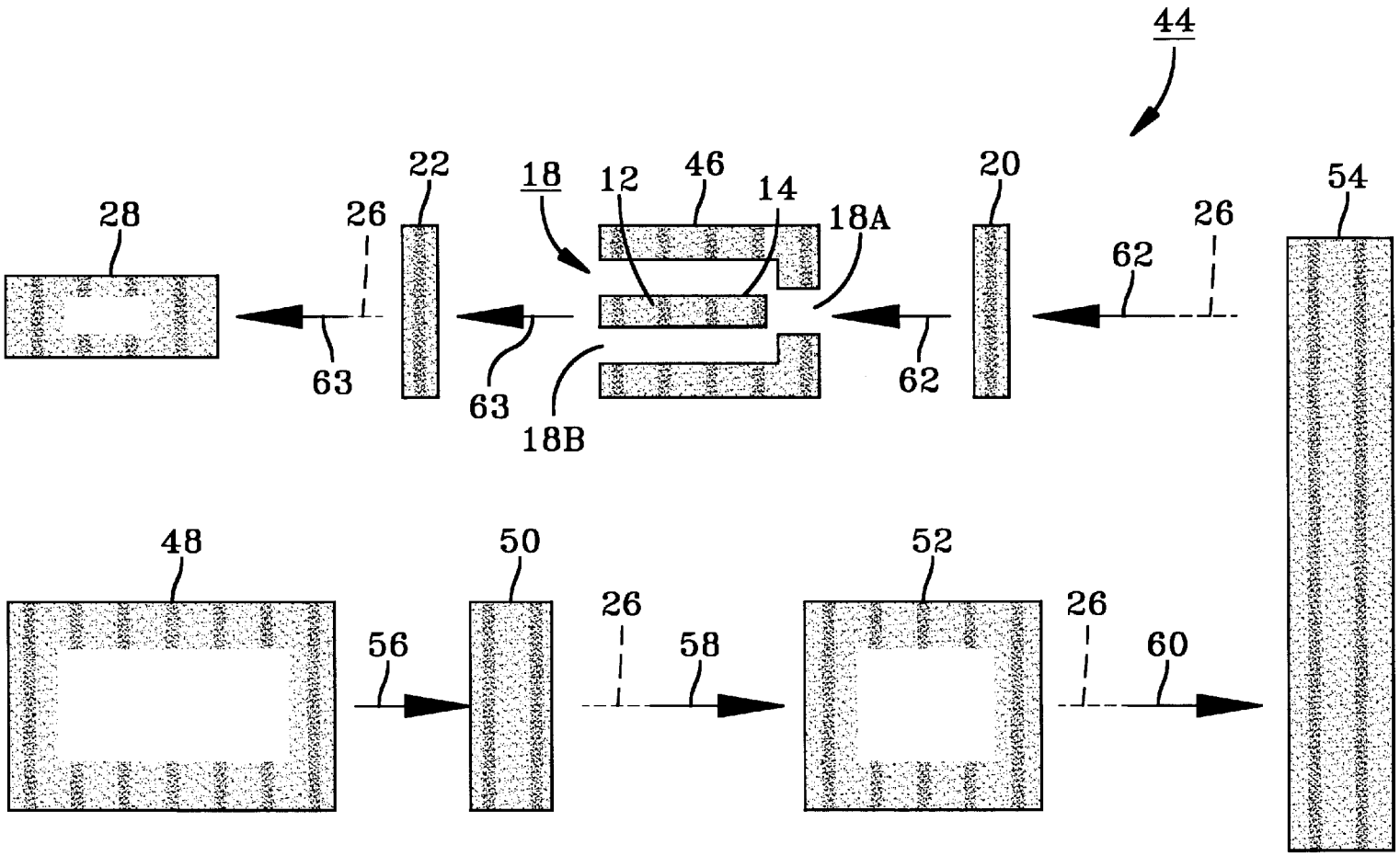
FIG. 4 is a block diagram of a second embodiment of a MOR spectrometer of the present invention.

A comparison between FIGS. 6 and 5 reveals that the MOR spectrometer 44 of FIG. 4 achieves a 10-fold improvement in the detection limit and the dynamic range over that achievable by an AAS device yielding the results shown in FIG. 5.

The improvement yielded by the MOR spectrometer 44 of FIG. 4 and the MOR spectrometer 10 of FIG. 1 is primarily provided by the use of a laser as the optical source which provides more input intensity to be used for the measurement of the atomic concentration being analyzed. This feature was realized after it was determined that the magneto-optic rotation signal, such as that exiting the optical polarizer 20, is dependent upon the input intensity of the optical source. The laser provides for performance improvement due to a better signal-to-noise ratio. The AAS spectrometers do not benefit from the use of a laser. Studies were also performed which concluded that MOR spectrometers using hollow cathode lamps that are the same as the light source used for AAS spectrometers have no significant advantages over AAS spectrometers.

It should now be appreciated that the practice of the present invention provides for a MOR spectrometer free of monochrometers and therefore having the advantage of attendant lightweightness, but in addition thereto, has improved detection limits and increased dynamic ranges as compared to AAS spectrometers and MOR spectrometers not having the benefits yielded by the employment of a laser light source.

Although the previously given description related to the use of the MOR spectrometer to measure the atomic concentration of an element in a substance, it should be realized that the practice of the present invention is equally applicable to the use of the MOR spectrometer of the present invention to measure the molecular concentration of a substance.

It is understood that the invention is not limited to the specific embodiments herein illustrated and described but ;may be otherwise without departing from the spirit and scope of the invention.

What we claim is:

1. A spectrometer for measuring the concentration of atoms and molecules of a substance comprising:

(a) means for atomizing said substance in a chamber;

(b) magnetic means providing a continuous magnetic field and surrounding said atomized substance but leaving a passageway having entrance and exit portions into and from said chamber;

(c) first and second stationary optical polarizers respectively located at said entrance and exit portions of said passageway;

(d) a laser source having a predetermined intensity and comprising collimated light rays focused into a path so as to pass through said first optical polarizer, into and out of said chamber and then pass through said second optical polarizer; and (e) an optical detector for detecting the intensity of the rays of said laser after said laser rays pass through said second optical polarizer and providing a representative output signal thereof.

2. The spectrometer according to claim 1 further comprising:

(a) a modulator interposed between said laser source and said first polarizer and intercepting said rays of said laser and providing a modulated light output to said first optical polarizer and a modulated electrical signal output; and (b) a lock-in amplifier having a balanced amplifier with two branches with the first branch receiving said output of said optical detector and a second branch receiving said modulated electrical signal.

3. The spectrometer according to claim 2, wherein said laser source has an operating wavelength in the range from about 200 nm to about 900 nm.

4. The spectrometer according to claim 1, wherein said magnetic means comprises an electromagnet that generates a magnetic field of up to about 10 KG.

5. The spectrometer according to claim 1, wherein said substance is atomized by aspiration.

6. The spectrometer according to claim 1, wherein said means for atomizing is selected from the group consisting of a graphite furnace, cold vapor generation and laser induced breakdown.

7. The spectrometer according to claim 1, wherein said laser source comprises:

(a) a Nd:YAG source that generates collimated light rays at a first predetermined operating wavelength;

(b) a first frequency doubler having an output and that receives the light rays of said Nd:YAG source and generates collimated light rays at a second predetermined operating wavelength which is about one-half of said first predetermined operating wavelength;

(c) a dye laser for generating tuneable light and that receives the output of said first frequency doubler and generates collimated light rays at a third predetermined operating wavelength; and (d) a second frequency doubler having an output serving as the output of said laser source and that receives the tuneable light of said dye laser and generates collimated light rays at a fourth predetermined frequency which is about one-half of said third predetermined operating wavelength.

8. The spectrometer according to claim 7, wherein said magnetic means comprises a permanent magnet that generates a magnetic field of up to about 4 KG.

* * * * *